US00RE47329E

(19) United States
(12) Reissued Patent
Bailey, Jr.

(10) Patent Number: US RE47,329 E
(45) Date of Reissued Patent: Apr. 2, 2019

(54) ANCHOR AND ALIGNMENT DEVICE FOR FLOOR COVERING TILES

(71) Applicant: CarpetLOK, LLC, New York, NY (US)

(72) Inventor: Wilson Edward Bailey, Jr., Forest Hill, MD (US)

(73) Assignee: CarpetLok, LLC, Pittsburgh, PA (US)

(21) Appl. No.: 14/595,340

(22) Filed: Jan. 13, 2015

Related U.S. Patent Documents

Reissue of:
(64) Patent No.: 8,353,078
Issued: Jan. 15, 2013
Appl. No.: 12/731,034
Filed: Mar. 24, 2010

(51) Int. Cl.
*A47G 27/04* (2006.01)

(52) U.S. Cl.
CPC ..... *A47G 27/0418* (2013.01); *Y10T 16/10* (2015.01); *Y10T 29/49947* (2015.01)

(58) Field of Classification Search
CPC ..... E04F 15/02452; E03C 5/168
USPC ..... 33/527; 52/126.6, 391, 677, 708
See application file for complete search history.

(56) References Cited

U.S. PATENT DOCUMENTS 677,725 A * 7/1901 Weeks ..... 16/17.1
2,236,465 A * 3/1941 Carlson ..... 52/179
3,318,057 A * 5/1967 Norsworthy ..... E04F 15/02452 52/126.6
4,010,301 A * 3/1977 Anderson ..... D04H 11/00 428/82
4,086,679 A 5/1978 Butler
D278,564 S * 4/1985 Reuben ..... D5/49
4,561,232 A * 12/1985 Gladden et al. ..... 52/126.6 X
4,744,194 A * 5/1988 Yasuyoshi ..... E04F 15/02458 52/126.6
4,837,889 A 6/1989 Saotome
4,901,490 A * 2/1990 Zinniel ..... E04F 15/02405 248/346.5
5,288,534 A 2/1994 Tavshanjian
5,359,783 A 11/1994 Smith
5,958,540 A * 9/1999 Berard et al. ..... 428/48
6,216,315 B1 * 4/2001 Fuzzell ..... 16/17.1
6,612,045 B2 9/2003 Kruskamp
6,625,951 B1 * 9/2003 McCarthy ..... 33/527 X
6,708,367 B2 * 3/2004 Billson ..... 16/16
7,140,156 B1 * 11/2006 Lowe et al. ..... 62/126.6 X
(Continued)

FOREIGN PATENT DOCUMENTS

WO WO 2009/052545 * 4/2009

*Primary Examiner* — Robert M Fetsuga
(74) *Attorney, Agent, or Firm* — Brenda Pomerance

(57) ABSTRACT

An anchor for a carpet tile includes a cross-shaped base having four arms extending from a vertex. The arms form a planar top surface and a planar bottom surface. A vertical blade centered on the base rises to engage the backing of a carpet tile when a corner of the carpet tile is placed near the vertex. The blade is preferably made of bendable and resilient material. Preferably, the anchor is used with a pedestal head of a raised-flooring system and has a nub extending from the bottom surface of each of the arms of the base to fit within holes in the pedestal head and thereby secure the anchor to the pedestal head. An alternative anchor includes a plate for the base and the blade in the shape of a cross rises from the plate. The plate may have a hole in each quadrant defined by the blade.

27 Claims, 7 Drawing Sheets

(56) References Cited

U.S. PATENT DOCUMENTS

| | | | | |
|---|---|---|---|---|
| 7,536,802 | B1 | 5/2009 | Tavy et al. | |
| 7,950,165 | B2 * | 5/2011 | Hall | E04F 15/02005 33/527 |
| 2010/0205874 | A1 * | 8/2010 | Zlatar | 52/126.6 |

* cited by examiner

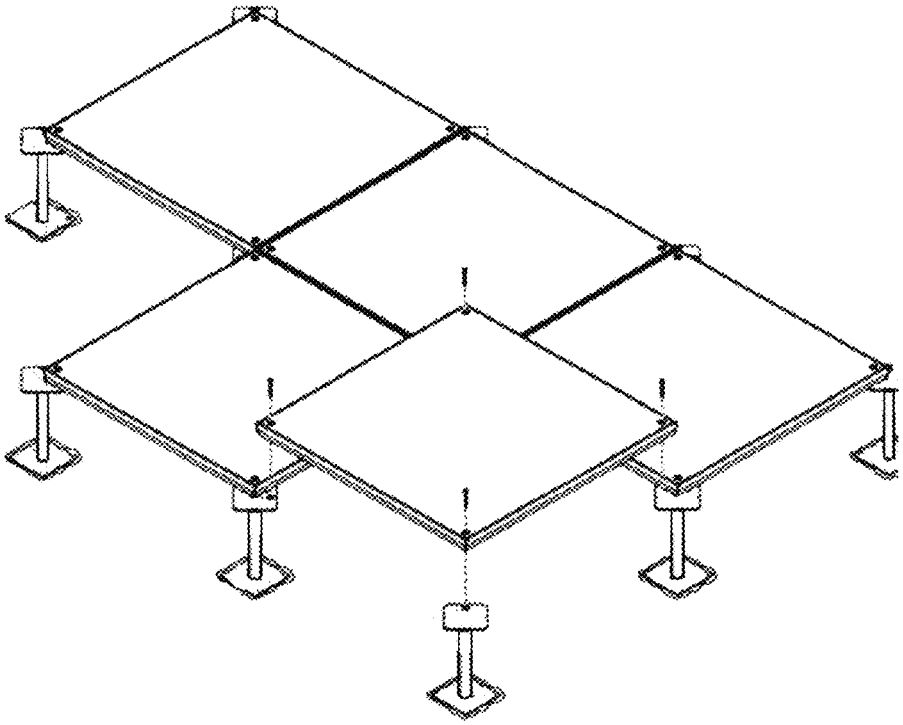
FIG. 5A (Prior Art) (New)

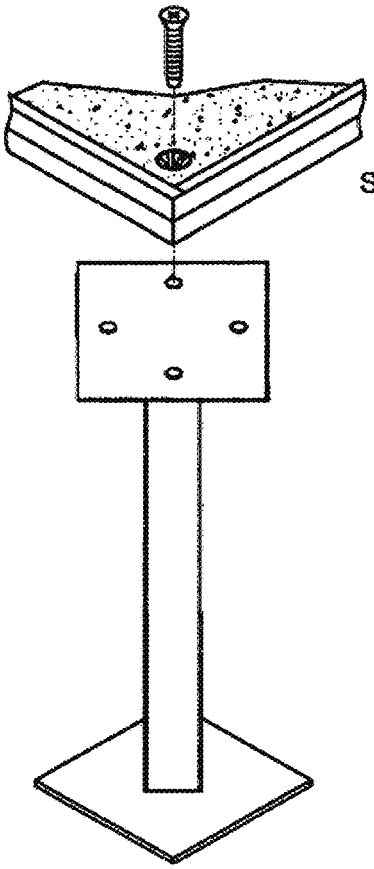
FIG. 5B (Prior Art)
(New)
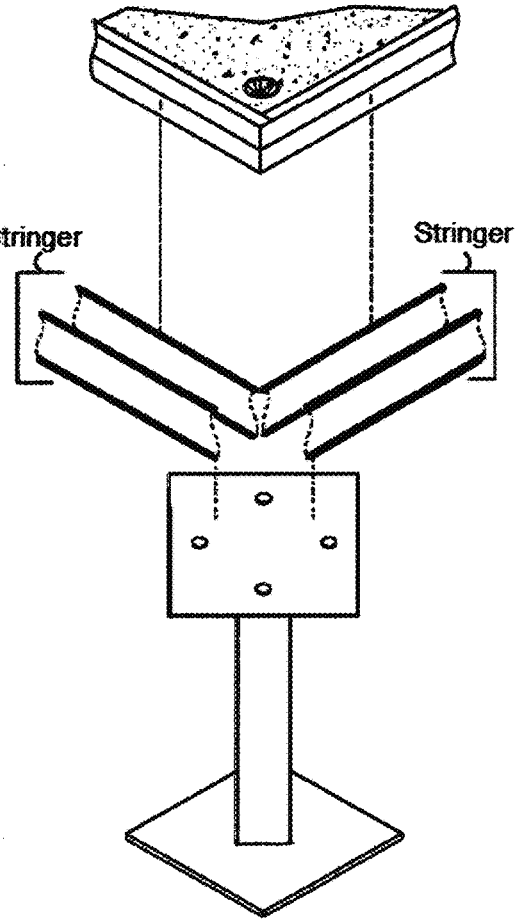
FIG. 6 (Prior Art)
(New)

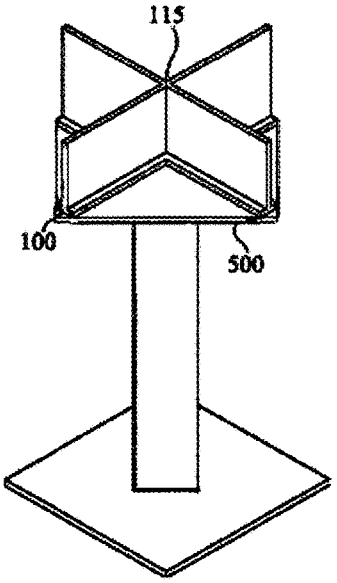
FIG. 7 (New)
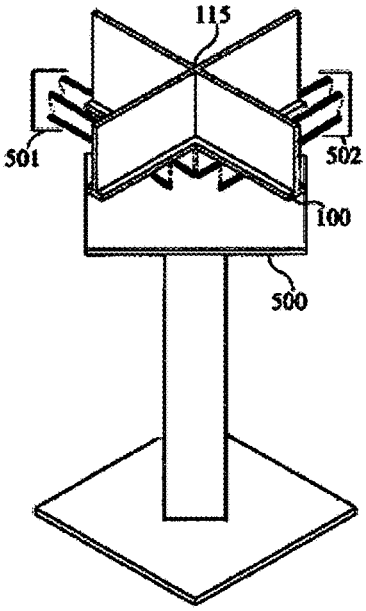
FIG. 8 (New)

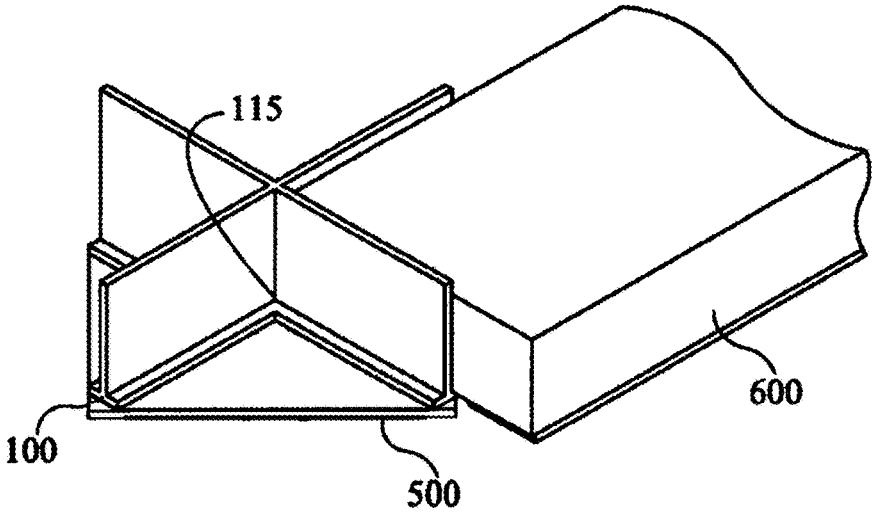
FIG. 9 (New)
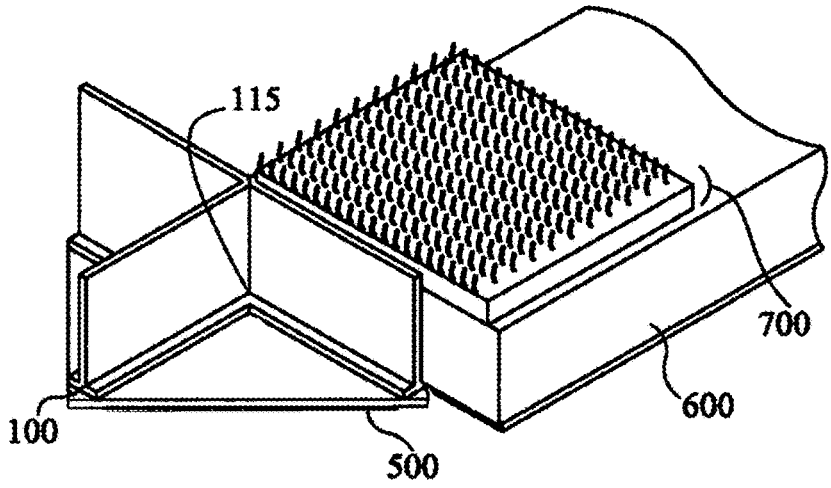
FIG. 10 (New)

ANCHOR AND ALIGNMENT DEVICE FOR FLOOR COVERING TILES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

In the field of carpet fasteners, a fastening device for securing and aligning carpet tiles in extended position upon floor-coverings.

BACKGROUND ART

The invention has primary application to raised floor systems using carpet tiles as a finished surface. Raised flooring, also called access flooring, is commonly found in commercial building over a cement slab.

Raised flooring systems usually include rectangular access floor panels made of metal. The access floor panels are reinforced or consist of metal covered composition wood cores. The panels are typically 2 feet by 2 feet steel or aluminum panels. The space below the panels is typically used for air flow, power, or voice and data cable trays.

The access floor panels may be installed in a gridless system or grid system. These systems vary in raised flooring system support, that is, the means of support for the access floor panels.

In gridless systems, *see FIGS. 5A-5B,* pedestal heads are positioned beneath the corners of four abutting panels so that each access floor panel is supported by a pedestal at one of its corners. Each pedestal is typically capable of height adjustment. The top of the pedestal where the access floor panels are attached is called the pedestal head. Each access floor panel spans four pedestals and is usually screwed to the pedestals at each corner. Thus, in a typical raised-flooring installation in a gridless system, pedestals are attached to the cement slab to provide an elevated, fixed support for access floor panels laid atop the pedestals.

A grid system, *see FIG. 6,* delivers increased stability and load capacity by connecting the pedestal heads using stringers, which are attached perpendicularly to the pedestal heads and arranged horizontally, that is, parallel to the subfloor. The grid system is configured when each stringer is registered with and positioned beneath an edge of a rectangular panel. The grid system provides the requisite additional support for each access floor panel along its entire periphery, rather than just at its corner.

Each carpet tile typically has the same dimensions as the access floor panel on which it is laid, which is usually 2 feet by 2 feet. Typical carpet tile has a backing to which the carpet pile or fibers are attached. A carpet tile may be attached with releasable adhesive or employ buttons on the bottom of the carpet backing to align with the holes in the access floor panel.

SUMMARY OF INVENTION

An anchor for a carpet tile includes a base in the shape of a plus sign or cross. As with a cross, the base has four arms extending from a vertex. The arms configured perpendicularly to each other to form a planar top surface and a planar bottom surface. A vertical blade, also in the shape of a cross, is centered on the base and rises to a height sufficient to engage the backing of a carpet tile when a corner of the carpet tile is placed near the vertex. The blade is preferably made of bendable and resilient material, such as nylon. Preferably, the anchor is used with a pedestal head or a stringer of a raised-flooring system and has a nub extending from the bottom surface of each of the arms of the base to fit within holes in the pedestal head or stringer and thereby secure the anchor to the pedestal head or stringer. An alternative anchor includes a plate for the base and the blade in the shape of a cross rises from the plate. The plate may have a hole in each quadrant defined by the blade.

Technical Problem

Carpet tiles can creep or move out of alignment during installation and when heavy loads such as office furniture or equipment are rolled over the tiles, giving an unsightly appearance and raising maintenance and replacement costs. A device is needed to help the installer keep a carpet tile in alignment with its access floor panel and to anchor the carpet tile without creating misalignment in the access flooring or creating a noticeable depression or protrusion in the carpet tile.

Solution to Problem

An anchor in the shape of a thin, flat cross with equally thin vertical blades. The anchor is configured to be easily attachable to the pedestal head or stringer to hold the backing of a carpet tile in alignment with its access floor panel and will prevent lateral movement of the carpet tile in heavy-load transit conditions.

Alternatively, an anchor may hold just the carpet tile in an installation directly to a substrate, e.g., a concrete slab or plywood underlayment, without an access floor system.

Advantageous Effects of Invention

The anchor will maintain carpet tiles in alignment with an access floor panel or simply in alignment with other carpet tiles on substrates, ramps or inclines. This will maintain the quality of the carpet tile installation, eliminate costly maintenance associated with displaced or misaligned carpet tiles; and will perform out of sight and feel of people walking on installed carpet tiles.

BRIEF DESCRIPTION OF DRAWINGS

The drawings illustrate preferred embodiments of the method of the invention and the reference numbers in the drawings are used consistently throughout. New reference numbers in FIG. 2 are given the 200 series numbers. Similarly, new reference numbers in each succeeding drawing are given a corresponding series number beginning with the figure number.

*FIGS. 5A-5B are views of a prior art gridless raised flooring system.*

*FIG. 6 is a view of a prior art raised flooring grid system.*

*FIGS. 7-10 are views referred to in explaining use of the first anchor embodiment.*

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention. For example, the steps in the method of the invention may be performed in any order that results making or using the anchor.

Figure 1:
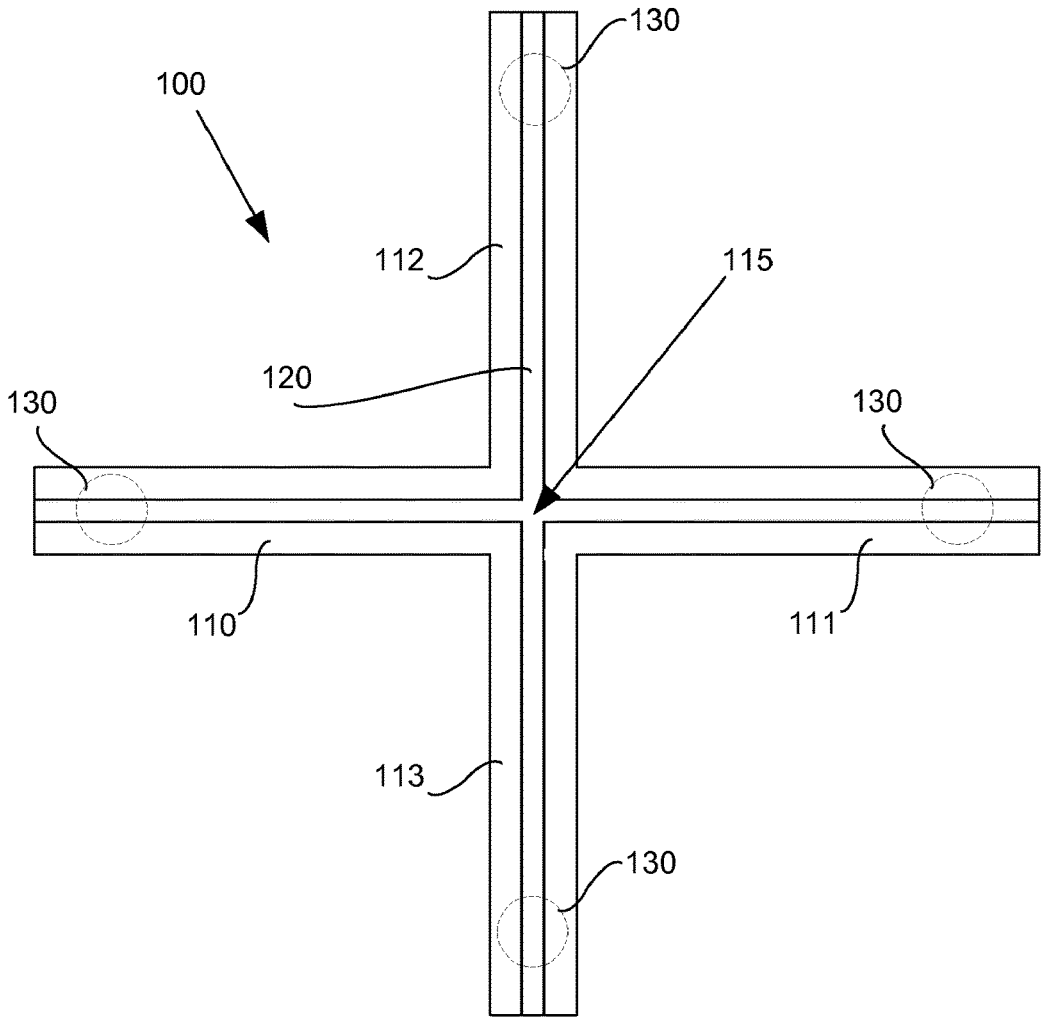
FIG. 1 is a plan view of a first anchor embodiment.

FIG. 1 shows a plan view of a preferred embodiment of the anchor (100). This anchor (100) is used [with a] *to anchor a floor covering tile, such as but not limited to, a* carpet tile, typically 24 inches square and having four corners. Carpet tiles typically are constructed with a backing and fibers attached to the backing.

The anchor (100) includes a base in the shape of a cross, or a plus sign, that is, a base comprising four arms extending from a vertex (115). The base is preferably a smooth, flat, relatively thin, rigid, yet bendable and resilient body of uniform thickness; yet, the material must be firm enough to prevent the carpet tile from moving out of alignment with the access floor panel. It is preferably made of nylon and more preferably recycled nylon.

Figure 2:
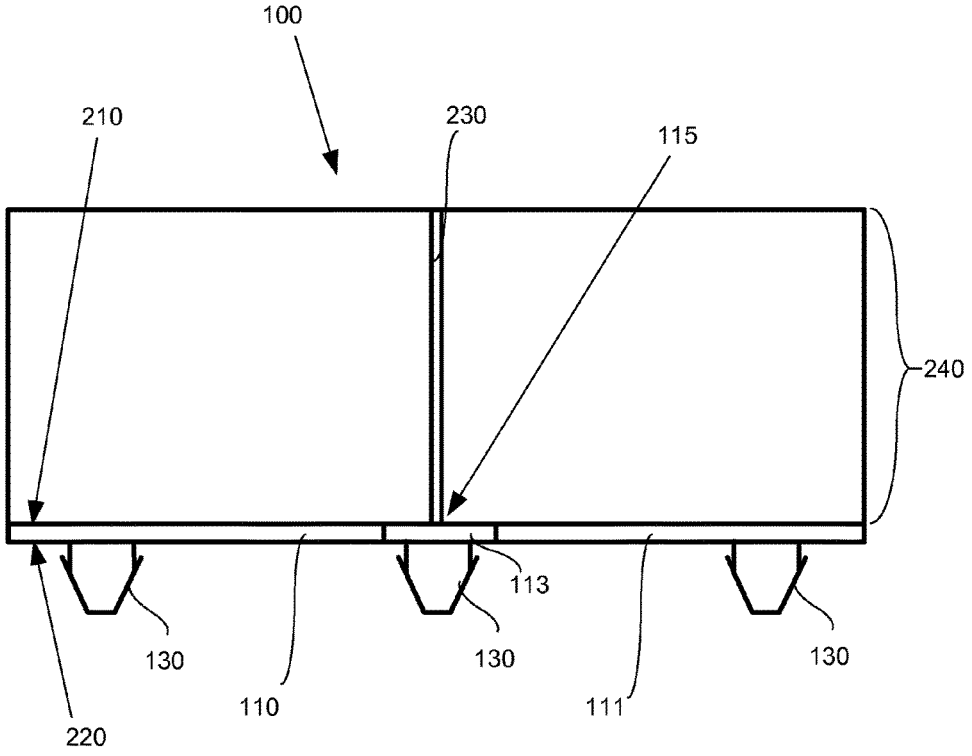
FIG. 2 is an elevation view of the first anchor embodiment.

The four arms shown are: a left arm (110); a right arm (111); a top arm (112); and a bottom arm (113). The arms come together at the vertex (115). The arms are configured perpendicularly to each other to form a planar top surface (210) and a planar bottom surface (220), as shown in the elevation view in FIG. 2

The anchor [(110)] (*100*) further includes a blade (120) in the shape of a cross, oriented vertically, and rising from the base to a height sufficient to *removably* engage the backing of the *removable* carpet tile when a corner of the carpet tile is placed near the vertex (115). *The blade* (*120*) *has a top edge* (*230*). The blade (120) engages the backing of the carpet tile in use when it protrudes above the top of the access floor panel just enough to engage the [thickness] *edges* of the carpet tile backing, which allows *the* carpet tile to be aligned with the access floor panel.

The blade (120), like the base is preferably a smooth, flat, relatively thin, rigid, yet bendable and resilient body of uniform thickness, preferably about half the thickness of the base. It is also preferably made of nylon and molded together with the base as a single piece.

The anchor [(110)] (*100*) may include a nub (130) extending from each of the arms on the planar bottom surface (220). Since there are four arms, this means that there are preferentially four nubs (130). Each nub (130) preferably is tapered and has upwardly slanting barbs to engage and lock within a hole in the pedestal head or stringer in a raised flooring system. Thus, the nubs (130) are useful in securing the anchor [(110)] (*100*) to a raised-flooring system support because they are configured to fit within holes in the pedestal head or stringer. A pedestal head usually has 4 such holes.

The anchor (100) is preferably used to anchor and align a carpet tile in a raised flooring system comprising an access floor panel and a raised flooring system support that includes either pedestal head or stringer.

The method involving such use includes a first step of securing the base to the pedestal head or stringer of the raised flooring system support by inserting [the] each nub into a hole in the raised flooring system support, that is, into the pedestal head or stringer. *FIG. 7 shows the base of anchor* (*100*) *secured to pedestal head* (*500*). *FIG. 8 shows the base of anchor* (*100*) *secured to stringers* (*510, 520*). The nubs would lock in place and hold the anchor (100) firmly resisting movement.

Then, *as shown in FIG. 9,* one would implement a second step of placing an access floor panel (*600*) near the vertex (115). The access floor panel (*600*) can be installed free standing using a stringer system, or may be screwed in place on the pedestal head and the anchor (100) will not interfere with either installation operation.

Once the access floor panel (*600*) is laid in place as a free-standing install in a stringer system, or is secured at four corners, and typically all adjacent access floor panels would be similarly installed, then one would implement the step of placing the carpet tile (*700*) atop the access floor panel to engage the blade (230) against the backing of the carpet tile (*700*), *as shown in FIG. 10*. The carpet tile would fit right up against the [bit of blade] *top edge* (230) *of blade* (*120*) sticking above the access floor panel with just enough height to engage the *edges of the* backing of the carpet tile (*700*), but preferably not extend up into the pile or fibers of the carpet tile (*700*), so as to be virtually undetectable to a person walking on the carpet tile (*700*).

Example 1

A preferred embodiment of the anchor (100) is one having dimensions where the distance from the end of the left arm (110) to the end of the right arm (111) is 82.55 millimeters (3.25 inches), which is equal to the distance from the end of the top arm (112) to the end of the bottom arm (113). Each arm is about 6.35 millimeters (0.25 inches) wide. The distance between the two nubs (130) on the vertical or the horizontal arms shown in FIG. 1 is about 63.50 millimeters (2.5 inches), wherein each nub (130) is about 31.75 millimeters from the vertex (115). The thickness of each arm in the base is about 1.57 millimeters (1/16 inch). The thickness of the blade 0.812 millimeters (1/32 inch). The height (240) of the blade will vary depending on the thickness of the access plate used and the thickness of the backing of the carpet tile. A typical height (240) will be about 32.46 millimeters (1.278 inches). Each nub (130) is about 5.05 millimeters (0.199 inches).

Figure 3:
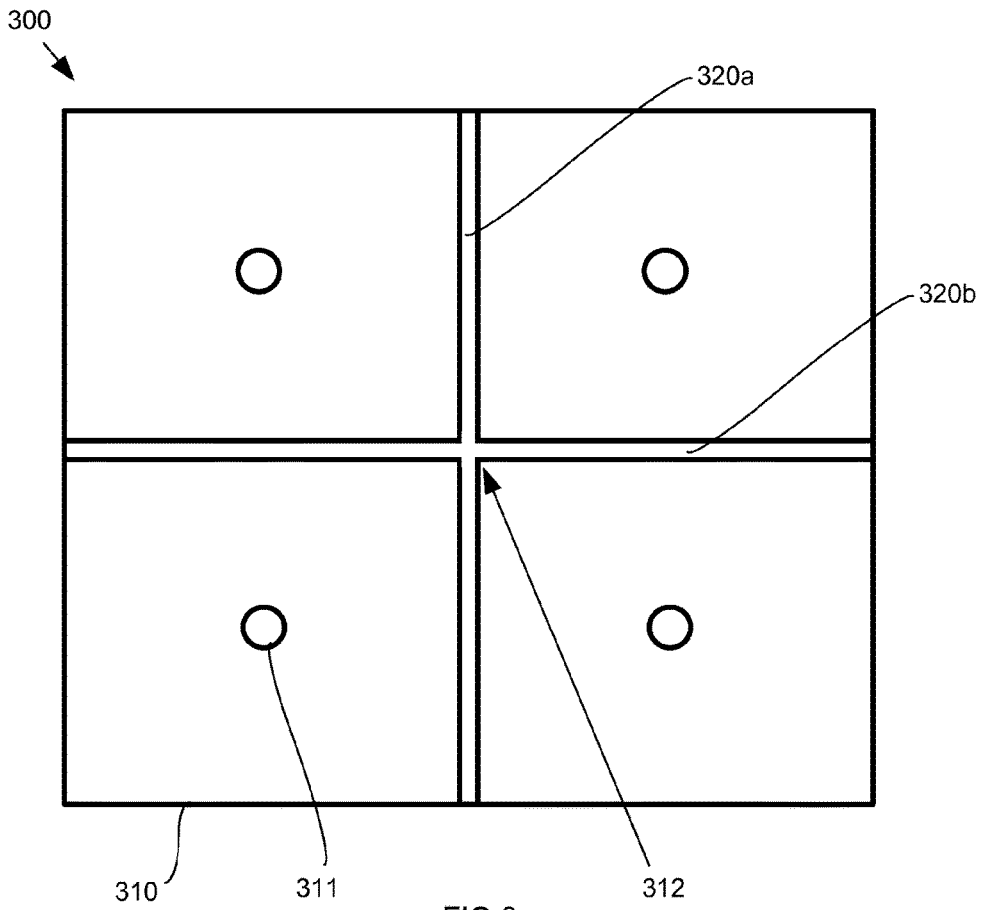
FIG. 3 is a plan view of a second anchor embodiment.
Figure 4:
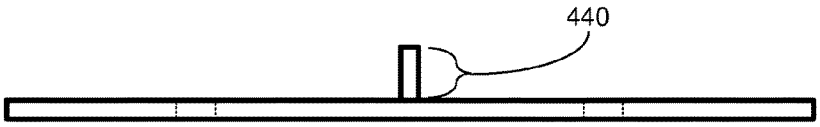
FIG. 4 is an elevation view of the second anchor embodiment.

FIG. 3 illustrates an alternative embodiment of an anchor (300) according to the invention, which also has application to a flat flooring surface, that is, an application to either a pedestal head or to a floor without a pedestal head.

This anchor (300) first includes a plate (310), which is preferably a smooth, flat, relatively thin, rigid, yet bendable and resilient body of uniform thickness. The plate (310) is preferably in a square configuration and may be configured to define a hole (311) in a quadrant defined by the segments of the blade [(230)] (*320*). Each hole in the plate (310) preferably aligns with the corner screws of the access floor panel. Each hole in the plate (310) may also be used for attachment to substrate surfaces. A releasable adhesive is preferably used to attach the plate to either a floor or a pedestal head.

This anchor (300) [next] includes a blade (*320*) in the shape of a cross or a plus sign. The blade (*320*) includes [two transverse segments:] a first [transverse segment] *portion* (320a)[:] *having two segments,* and[.] a second [transverse segment] *portion* (320b) *having two segments*. The [two transverse] *four* segments form a vertex (312) at their intersection. The [two transverse] *four* segments are configured perpendicularly to each other. *The blade* (*320*) *has a top edge* (*430*). Together the [two transverse] *four* segments rise vertically from the plate (310) to a height (440) sufficient to *removably* engage the backing of the *removable* carpet tile when a corner of the carpet tile is placed near the vertex (312). The first [transverse segment] *portion* (320a) and the second [transverse segment] *portion* (320b) are each preferably a smooth, flat, relatively thin, rigid, yet bendable and resilient body of uniform thickness, preferably made of nylon and molded in one piece with the plate (310).

Example 2

A preferred embodiment of the anchor (300) for use where only the carpet tile sits above the plate (310) is one where the thickness of the square plate (310) is about 0.25 to 0.5 millimeters (0.01 to 0.02 inches) and the blade rises to a height (440) of about 2 millimeters (0.08 inches).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the building and flooring industries.

What is claimed is:

1. An anchor system comprising a combination of a carpet tile *and an anchor*, the carpet tile comprising four corners, *four edges*, a backing and fibers attached to the backing, [the combination further comprising an anchor,]

the anchor comprising:

a *rigid* base in the shape of a cross, the base [comprising] *having* four arms [extending from] *forming* a vertex *at their intersection*, the arms configured perpendicularly to each other to form a planar top surface and a planar bottom surface; and a *rigid* blade comprising a top edge in the shape of a cross, said blade rising from the base to a height *greater than the height of an access floor panel,* with the top edge *of the blade removably* engaging [the backing] *two of the edges* of the carpet tile, *thereby anchoring the carpet tile against movement,* when a corner of the carpet tile is placed near the vertex.

2. The anchor system of claim 1, wherein the blade comprises a [bendable and] resilient material.

3. The anchor system of claim 1, wherein the blade consists of nylon.

4. The anchor system of claim 1, the combination further comprising a pedestal head, the pedestal head defining a hole, the anchor further comprising a nub, the nub comprising a round cross-section extending from [each] *one* of the arms on the planar bottom surface; wherein [each such] *the* nub is configured to fit within [a] *the* hole in the pedestal head and thereby secure the anchor to the pedestal head.

5. An anchor system comprising a combination [offer] *of* a carpet tile *and an anchor*, *the anchor system used with a floor lacking a pedestal head;* the carpet tile comprising four corners, a backing and fibers attached to the backing[.]*;*

[the combination further comprising an anchor,] the anchor comprising:

a *rigid square* plate *attached directly to the floor*; and a *rigid* blade *rising vertically from the plate, the blade* comprising a top edge in the shape of a cross, the blade comprising [two transverse] *four* segments forming a vertex at their intersection, the [transverse] segments configured perpendicularly to each other [and rising vertically from the plate to a height with] *and defining four quadrants on the plate,* the top edge *of the blade removably* engaging the backing of the carpet tile, *and anchoring the carpet tile against movement,* when a corner of the carpet tile is placed near the vertex.

6. The anchor system of claim 5, wherein *at least one of the quadrants of* the plate [defines] *has* a hole [in a quadrant defined by the segments of the blade] *for coupling the plate to the floor*.

7. A method of anchoring [the] *a* carpet tile [of claim 4] to [an access floor panel] *a raised flooring system using an anchor,*

(*a*) *the carpet tile having four corners, four edges, a backing and fibers attached to the backing;*

(*b*) *the raised flooring system comprising an access floor panel and a pedestal for supporting the access floor panel, the pedestal having at least one hole;*

(*c*) *the anchor having*

(*i*) *a rigid base in the shape of a cross, the base having a planar top surface and a planar bottom surface,*

(*ii*) *a rigid blade in the shape of a cross, the blade comprising four arms, each arm rising from the base to a height greater than the height of an access floor panel, the arms being perpendicular to each other and forming a vertex at their intersection,*

(*iii*) *at least one nub extending from the planar bottom surface, the nub having a round cross-section for fitting within the hole in the pedestal;*

*the method* comprising [the steps of]:

securing the base *of the anchor* to the pedestal head by inserting the [each] nub *of the anchor* into the hole *of the pedestal*;

placing [an] *the* access floor panel near the vertex *of the anchor*; and placing *a corner of* the carpet tile atop the access floor panel *near the vertex of the anchor* to *removably* engage *two arms of* the blade *of the anchor* against [the backing] *two edges of the carpet tile, thereby anchoring the carpet tile against movement*.

8. A method of using [the] *an* anchor [system of claim 1] *and a carpet tile* with raised flooring*;*

(*a*) *the carpet tile having four corners, four edges, a backing and fibers attached to the backing;*

(*b*) *the raised flooring comprising access floor panels having a thickness, and pedestal heads connected by stringers, the pedestal heads and stringers for supporting the access floor panels,*

(*c*) *the anchor having*

(*i*) *a rigid base in the shape of a cross having four arms, the base having a planar top surface and a planar bottom surface,*

(*ii*) *a rigid blade in the shape of a cross, the blade comprising four arms, each arm rising from the base to a height greater than the height of one of the access floor panels, the arms being perpendicular to each other and forming a vertex at their intersection*, the method comprising[the step of]:

attaching the anchor to a structure selected from the group consisting of [a] *one of the* pedestal [head] *heads*, and [a stringer] *one of the stringers*,

[said attaching performed such that] *placing one of the access floor panels near the vertex of the anchor; and*

*placing a corner of the carpet tile atop the access floor panel near the vertex of the anchor, so two edges of the carpet tile are removably engaged against two arms of the blade of the anchor, thereby anchoring the carpet tile against movement;*

*wherein* the anchor: (*i*) holds the backing of the carpet tile in alignment with its access floor panel; and (*ii*) prevents lateral movement of the carpet tile under load transit conditions.

9. A method of using [the] *an* anchor [system of claim 1 with raised flooring,] *and a carpet tile with a floor lacking a pedestal head;*

(*a*) *the carpet tile having four corners, a backing, and fibers attached to the backing;*

(*b*) *the anchor having*

*a rigid square plate, and*

*a rigid blade rising vertically from the plate, the blade having a cross shape and comprising four arms forming a vertex at their intersection, the arms configured perpendicularly to each other and defining four quadrants on the plate;* the method comprising [the step of maintaining a plurality of carpet tiles in alignment on a substrate]*:*

*attaching the plate directly to the floor; and*

*removably placing a corner of the carpet tile near the vertex of the blade so that two of the arms of the blade engage the backing of the carpet tile, thereby anchoring the carpet tile against movement.*

*10. The anchor system of claim 1, wherein the planar bottom surface of the anchor is coupled to a raised flooring system support.*

*11. The anchor system of claim 1, wherein the blade is centered on the base.*

*12. An anchor system comprising a combination of a floor covering tile and an anchor;*

*the floor covering tile having four corners and four edges;*

*the anchor comprising:*

(*a*) *a rigid base in the shape of a cross, the base comprising four arms forming a vertex at their intersection, the arms configured perpendicularly to each other to form a planar top surface and a planar bottom surface; and*

(*b*) *a rigid blade comprising a top edge in the shape of a cross, the blade rising from the base to a height greater than the height of an access floor panel, with the top edge of the blade removably engaging two edges of the floor covering tile, thereby anchoring the floor covering tile against movement, when a corner of the floor covering tile is placed near the vertex of the anchor.*

*13. The anchor system of claim 12, wherein the floor covering tile is a carpet tile.*

*14. The anchor system of claim 12, wherein the base is coupled to a raised flooring system supporting access floor panels, and the area of the floor covering tile is approximately equal to the area of one of the access floor panels.*

*15. The anchor system of claim 12, wherein the blade is centered on the base.*

*16. The anchor system of claim 12, the anchor further comprising:*

*a nub having a top edge connected to the bottom of an arm of the base, the nub for fitting within an opening of a support of a raised flooring system to secure the arm of the base of the anchor to the support of the raised flooring system.*

*17. An anchor system comprising a combination of a removable floor covering tile and an anchor, the anchor system used with a floor lacking a pedestal head;*

*the removable floor covering tile having four corners and a back; and*

*the anchor comprising*

(*a*) *a rigid square plate attached directly to the floor; and*

(*b*) *a rigid blade rising vertically from the plate, the blade having a top edge in the shape of a cross, the blade comprising four arms forming a vertex at their intersection, the arms configured perpendicularly to each other and defining four quadrants on the plate, with the top edge of the blade removably engaging the removable floor covering tile, thereby anchoring the removable floor covering tile against movement, when a corner of the removable floor covering tile is placed near the vertex.*

*18. The anchor system of claim 17, wherein the removable floor covering tile is a carpet tile.*

*19. The anchor system of claim 17, further comprising:*

*four openings in the plate, each opening in a respective quadrant defined by the arms, the openings used in the attaching the plate directly to the floor.*

*20. A method of anchoring a floor covering tile to a raised flooring system using an anchor,*

(*a*) *the floor covering tile having four corners, four edges, and a back;*

(*b*) *the raised flooring system comprising an access floor panel and a pedestal head for supporting the access floor panel, the pedestal head having at least one hole;*

(*c*) *the anchor having*

(*i*) *a rigid base in the shape of a cross, the base having a planar top surface and a planar bottom surface,*

(*ii*) *a rigid blade in the shape of a cross, the blade comprising four arms, each arm rising from the base to a height greater than a height of the access floor panel, the arms being perpendicular to each other and forming a vertex at their intersection,*

(*iii*) *at least one nub extending from the planar bottom surface, the nub having a round cross-section for fitting within the hole of the pedestal;*

*the method comprising:*

*securing the base of the anchor to the pedestal by inserting the nub of the anchor into the hole of the pedestal;*

*placing the access floor panel near the vertex of the anchor; and*

*placing one of the corners of the floor covering tile atop the access floor panel near the vertex of the anchor, to removably engage the blade of the anchor against two edges of the floor covering tile, thereby anchoring the floor covering tile against movement.*

*21. The method of claim 20, wherein the floor covering tile is a carpet tile.*

*22. The method of claim 20, wherein the area of the floor covering tile is approximately equal to the area of the access floor panel.*

*23. The method of claim 20, wherein the pedestal head has three additional holes, the anchor has three additional nubs extending from the planar bottom surface of respective arms of the base for fitting within respective holes of the pedestal head, and further comprising inserting each of the three additional nubs of the anchor into a respective one of the three additional holes of the pedestal head.*

*24. A method of using an anchor to anchor a removable floor covering tile to a floor lacking a pedestal head,*

(*a*) *the removable floor covering tile having four corners and a back;*

(*b*) *the anchor having*

*a rigid square plate and*

*a rigid blade rising vertically from the plate, the blade having a cross shape and comprising four arms forming a vertex at their intersection, the arms configured perpendicularly to each other and defining four quadrants on the plate;*

*the method comprising:*

*attaching the plate directly to the floor; and*

*placing a corner of the removable floor covering tile near the vertex of the blade to removably engage two of the arms of the blade against the removable floor covering tile, thereby anchoring the removable floor covering tile against movement.*

*25. The method of claim 24, wherein the removable floor covering tile is a carpet tile.*

*26. The method of claim 24, wherein the plate has at least one opening used in attaching the plate directly to the floor.*

*27. The method of claim 24, wherein the floor is a concrete slab.*

* * * * *